Figure 1:
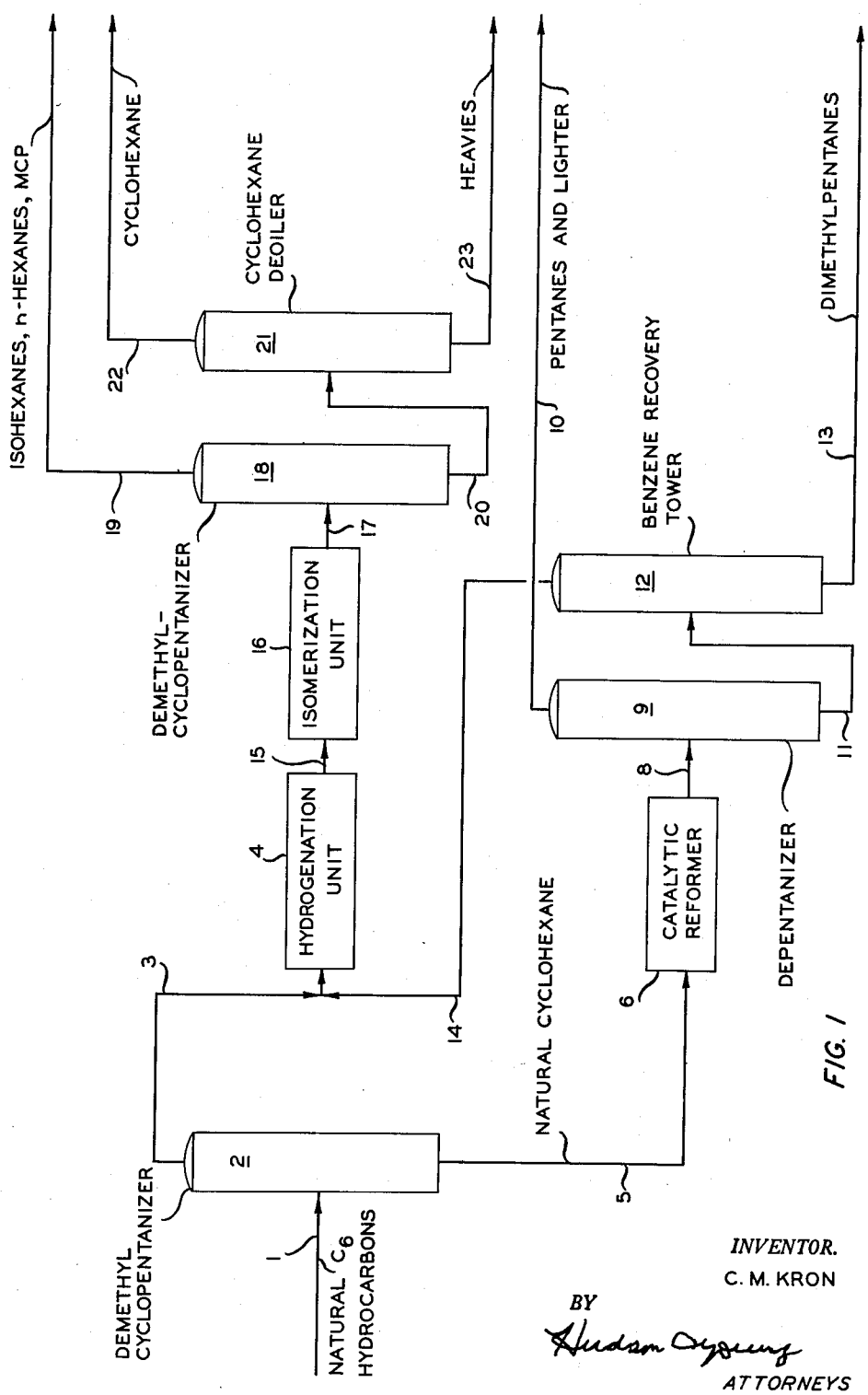

INVENTOR.
C. M. KRON
BY
ATTORNEYS

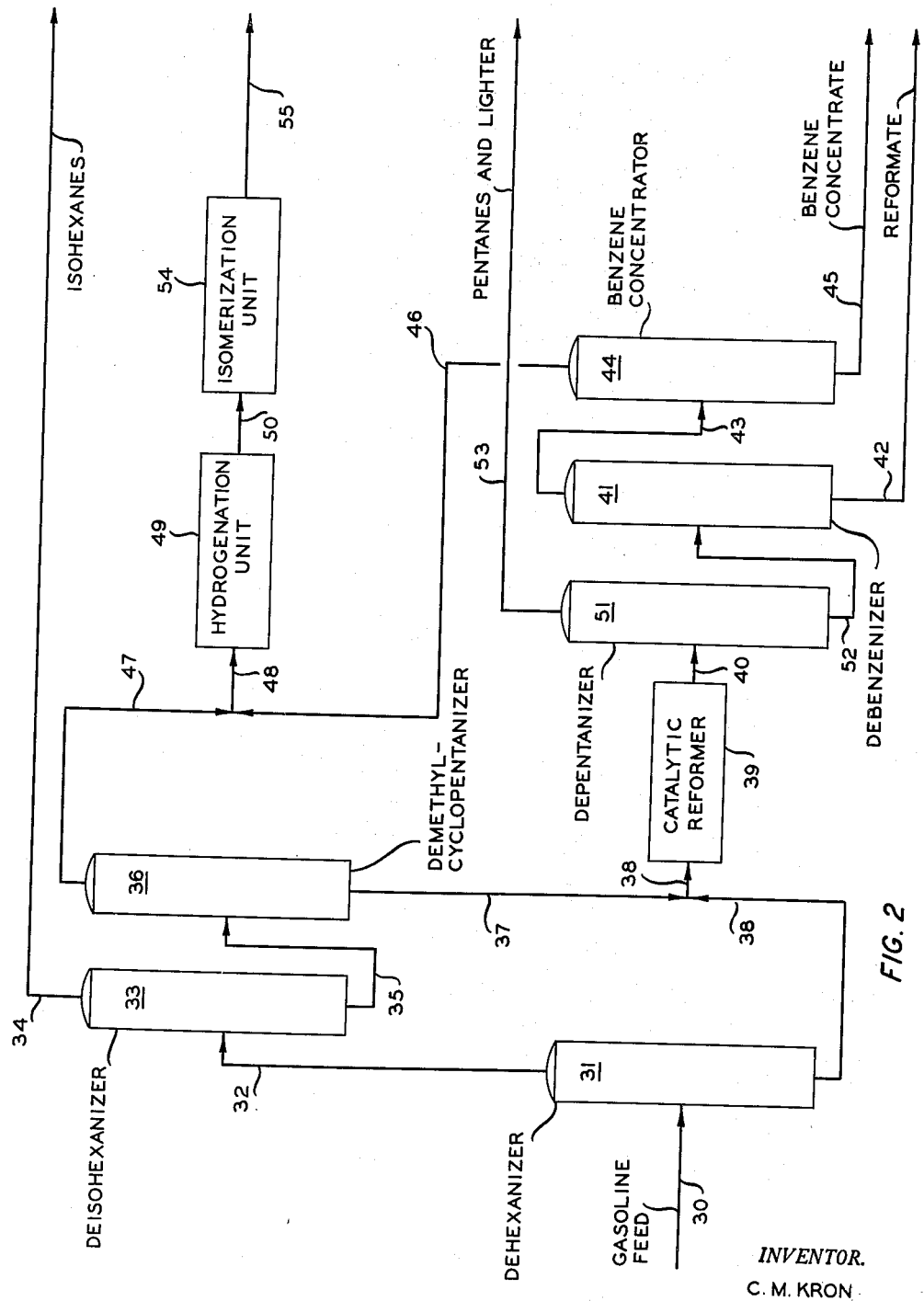

United States Patent Office 3,009,002
Patented Nov. 14, 1961

3,009,002
HIGH PURITY CYCLOHEXANE FROM NATURAL CYCLOHEXANE-CONTAINING FRACTION
Carl M. Kron, Houston, Tex., assignor to Phillips Petroleum Company, a corporation of Delaware
Filed June 20, 1960, Ser. No. 37,333
7 Claims. (Cl. 260—667)

This invention relates to the production of a high purity cyclohexane. In one of its aspects, the invention relates to production of a high purity cyclohexane from a natural cyclohexane-containing fraction also containing close-boiling dimethylpentanes by reforming said fraction, recovering from the reforming step methylcyclopentane and benzene substantially free from dimethylpentane, hydrogenating the benzene and isomerizing the methylcyclopentane and recovering high purity cyclohexane from the hydrogenated and isomerized material.

The problems arising in the production of a high purity cyclohexane fraction from naturally occurring cyclohexane include the fact that close-boiling dimethylpentanes are present in the natural cyclohexane concentrates, making it difficult, if not economically unfeasible, to produce a high purity material by distillation, extraction, or even crystallization.

I have now discovered a process for producing high purity cyclohexane from naturally occuring cyclohexane which comprises a combination of related steps of the character such that there is produced relatively cheaply cyclohexane of a high purity (98 percent) and, if desired, a benzene concentrate useful for various purposes. The process involves as an essential step the catalytic conversion of the natural cyclohexane to benzene and to methylcyclopentane and, upon recovery of the same, their hydrogenation and isomerization to cyclohexane.

In one embodiment of the invention, the natural cyclohexane is converted in a catalytic reforming zone together with and in presence of a reformer zone feed stock, for example, a low end point (LEP) reforming feed stock or gasoline. Under such operational conditions, there is obtained not only more benzene in the reformate than can be accounted for by the natural cyclohexane in the feed but also more methylcyclopentane than can be expected from the added cyclohexane. Since the natural cyclohexane was found to have been converted to methylcyclopentane as well as to benzene in the catalytic reforming zone, the subsequent yield of high purity cyclohexane was much higher than was expected.

It is found that subjecting cyclohexane to reforming conditions results in the conversion of 15 to 20 percent of the cyclohexane to methylcyclopentane with the majority of the remainder being converted to benzene. The normal boiling points of the components under consideration are as follows:

| | ° F. |
|---|---|
| Methylcyclopentane | 161.3 |
| 2,2-dimethylpentane | 174.5 |
| Benzene | 176.2 |
| 2,4-dimethylpentane | 176.9 |
| Cyclohexane | 177.3 |
| 3,3-dimethylpentane | 186.9 |
| 2,3-dimethylpentane | 193.6 |

A study of these data reveals the value of converting cyclohexane which contains dimethylpentanes to methylcyclopentane to facilitate the isolation of the dimethylpentanes by distillation. It is found that upon distillation of a mixture of the above-listed components the "methylcyclopentane fraction" contains about 10 percent benzene, and the residual benzene concentrate contains the dimethylpentanes. The methylcyclopentane fraction can be converted to cyclohexane by hydrogenation and isomerization. Thus, all of the methylcyclopentane and about 10 percent of the benzene produced by catalytic conversion of the natural cyclohexane can be readily recovered as high purity cyclohexane. If the 2,3- and 3,3-dimethylpentanes have been previously removed from the natural cyclohexane, additional high purity cyclohexane can be produced by distilling the residual benzene concentrate containing the dimethylpentane into an overhead fraction containing a 50 percent mixture of benzene and dimethylpentanes and a bottoms benzene product that is substantially free of dimethylpentanes, followed by hydrogenation of the latter fraction. Even if it is not desired to practice the last-mentioned sequence of steps, the benzene concentrate is also valuable as a source of high purity benzene and as a gasoline blending stock because it has a higher octane rating than does cyclohexane.

In one embodiment of the invention, the mixed feed of natural $C_6$ hydrocarbons containing normal hexane, benzene, methylcyclopentane, and cyclohexene, and a reformer feed stock are processed as follows in a combination of a hydrogen, an isomerization and a catalytic reforming unit.

Generally, in one embodiment of the invention, natural $C_6$ hydrocarbons are demethylcyclopentanized, obtaining a natural cyclohexane concentrate containing dimethylpentanes, and this concentrate is passed with a reformer feed stock to a catalytic reforming zone, the effluent of which, after depentanization, is passed to a methylcyclopentane benzene recovery step from which the methylcyclopentane and benzene is passed with normal hexane, benzene and methylcyclopentane obtained in the demethylcyclopentanizing step to a benzene hydrogenation and methylcyclopentane isomerization operation from which the effluent is treated by conventional means to obtain a high purity cyclohexane product. In another embodiment of the invention, a depentanized low end point gasoline is dehexanized, the hexane fraction thus obtained is deisohexanized, the deisohexanized fraction is demethylcyclopentanized, resulting in a cyclohexane and dimethylpentanes-containing fraction which, together with the dehexanized, depentanized, low end point gasoline is passed to a catalytic reforming zone. Effluent from the catalytic reforming zone is passed to a debenzenizer from which there is obtained a stream containing methylcyclopentane and benzene which, together with the normal hexane, methylcyclopentane, and benzene obtained upon demethylcyclopentanizing, the deisohexanized hexane fraction obtained from the depentanized low end point gasoline is passed to a methylcyclopentane isomerization and benzene hydrogenation section resulting in a product from which cyclohexane can be recovered.

It is an object of this invention to produce high purity cyclohexane. It is another object of this invention to produce high purity cyclohexane from naturally occurring cyclohexane. It is a further object of this invention to provide a relatively cheap and readily feasible process for the production of high purity cyclohexane from naturally occurring cyclohexane which occurs together with close-boiling, difficulty-separable dimethylpentanes.

Other aspects, objects and the several advantages of the invention are apparent from this description, the drawings and the appended claims.

According to the present invention, there is provided a process for the production of a high purity cyclohexane from a natural cyclohexane-containing fraction also containing close-boiling dimethylpentanes which comprises subjecting said fractions to reforming conditions in a reforming zone together with and in the presence of a reforming zone gasoline feed stock, recovering from said zone a fraction containing methylcyclopentane and benzene substantially free from dimethylpentane and hydrogenating and isomerizing said last fraction and obtaining a high purity cyclohexane from the resulting product.

FIGURE 1 shows an operation according to the invention where natural $C_6$ hydrocarbons-containing fraction are fed to an operation according to the invention. FIGURE 2 shows an operation according to the invention in which the feed stock is depentanized low end point gasoline.

Referring now to FIGURE 1, natural $C_6$ hydrocarbons are passed by 1 to demethylcyclopentanizer 2. Overhead 3 from tower 2 contains normal hexane, benzene, and methylcyclopentane which are passed to benzene hydrogenation unit 4. Bottoms from tower 2, which contain natural cyclohexane and dimethylpentanes, pass by 5 to catalytic reformer zone 6. Effluent from 6 is passed by 8 to depentanizer 9, overhead from which is passed by 10 from the process. Bottoms from depentanizer 9 are passed by pipe 11 to benzene-recovery tower 12 from which bottoms containing dimethylpentanes are passed by pipe 13 from the process. Overhead from benzene-recovery tower 12 contains methylcyclopentane, benzene, isohexane and normal hexane and is passed by pipe 14 to benzene hydrogenation unit 4 wherein essentially benzene is converted to cyclohexane. Effluent from 4 is passed by 15 to methylcyclopentane isomerization unit 16 wherein methylcyclopentane and some hexane are isomerized to cyclohexane and isohexane, respectively. Isomerization zone effluent is passed by 17 to demethylcyclopentanizer 18, overhead 19 from which contains isohexanes, n-hexane and methylcyclopentane. Bottoms from 18 are passed by 20 to cyclohexane deoiler 21, overhead 22 of which is 98 percent plus cyclohexane. Bottoms 23 are essentially higher-boiling materials which are removed from the process.

Referring now to FIGURE 2, depentanized low end point gasoline is passed by 30 to dehexanizer 31, overhead 32 from which is passed to deisohexanizer 33, overhead 34 of which is essentially isohexanes which are removed from the process. The deisohexanized fraction or bottoms from 33 pass by 35 to demethylcyclopentanizer 36, bottoms from which essentially contain cyclohexane and dimethylpentanes and passed by 37 together with dehexanizer bottoms from 31 by way of 38 to catalytic reformer zone 39, effluent 40 of which is stabilized in tower 51 to yield low boiling stream 53 which is removed from the process. Stream 52 is debenzenized in 41, yielding reformate 42 and overhead 43 which is passed to benzene concentrator 44, bottoms 45 of which are a benzene concentrate containing the dimethylpentanes. This concentrate is removed from the process. Overhead from 44 contains essentially methylcyclopentane and benzene and passes by 46 together with demethylcyclopentanizer overhead 47 by 48 to a benzene hydrogenation unit 49 and methylcyclopentane isomerization unit 54, effluent 55 from which is processed to recover therefrom high purity cyclohexane in the same manner as in FIGURE 1.

EXAMPLE

In a commercial operation in accordance with FIGURE 2, a low end point, dehexanized gasoline stream 38 had the characteristics shown in Table I. This stream was combined with a natural cyclohexane stream 37 comprising the components tabulated in Table IV, and was introduced to a catalytic reformer 39 that utilized a platinum-containing catalyst. The reformer was operated under the conditions shown in Table II and resulted in the production of a stabilized reformate 52 having the characteristics shown in Table I.

The stabilized reformate was fractionated in a dehexanizer 41 and benzene concentrator 44 operated in accordance with the conditions shown in Table III. A benzene concentrate 45 produced as the bottoms product of column 44 contained the majority of the dimethylpentanes. The column overhead product 46 was a benzene-methylcyclopentane concentrate suitable for passage to benzene hydrogenation reactor 49 and methylcyclopentane isomerization reactor 50. Component analyses of the last two-mentioned process streams are shown in Table IV. Typical operating conditions for the hydrogenation and isomerization reactor are shown in Table V. The effluent from these reactors was fractionated to produce 98 percent cyclohexane.

In the detailed specific example just presented, the process embodied the features of combining the natural cyclohexane stream with a gasoline stream prior to the reforming step and the production of a benzene concentrate as a product of the process. It is obvious to those skilled in the art that these steps can be omitted by proper choice of operating conditions. Omission of these steps results in operation in accordance with the flow scheme of FIGURE 1. The data in Table VI were obtained while operating a catalytic reformer with a natural cyclohexane concentrate alone. This feed concentrate contained 64 percent cyclohexane. The run resulted in the conversion of about 96 percent conversion of the cyclohexane. Based on 100 mols of cyclohexane destroyed, the $C_6$ hydrocarbons were produced in the molar quantities:

|  | Mols |
|---|---|
| 2,2-dimethylbutane | 0.5 |
| 2-methylpentane and 2,3-dimethylbutane | 3.3 |
| 3-methylpentane | 2.9 |
| Normal hexane | 6.1 |
| Methylcyclopentane | 18.8 |
| Benzene | 66.2 |
| Unaccounted for | 2.2 |
|  | 100.0 |

Table I

|  | LEP Gasoline (38) | Stabilized Reformate (52) |
|---|---|---|
| Distillation, °F.: |  |  |
| IBP | 200 | 182 |
| 5% | 206 | 192 |
| 10% | 209 | 198 |
| 20% | 214 | 204 |
| 50% | 220 | 218 |
| 90% | 241 | 253 |
| EP | 316 | 330 |
| Hydrocarbon Analyses, Liquid Volume Percent: |  |  |
| Aromatics plus olefins | 9.0 | 42.0 |
| Naphthenes | 49.5 | 22.0 |

Table II

| Hydrocarbon Rates, bbl./hr.: |  |  |
|---|---|---|
| LEP Gasoline (38) | 475 |  |
| Natural Cyclohexane (37) | 30 |  |
| Stabilized Reformate (52) | 450 |  |
| Hydrogen/Hydrocarbon Ratio, mol/mol | 7.3 |  |
| Hydrogen Purity, mol percent | 94.0 |  |
| Catalyst Life bbl. hydrocarbon/lb. catalyst | 132 |  |
| Reactor Temperature, Reactor Inlet and T, °F.: |  |  |
| Reactor No.— |  |  |
| 1 | 910 | 87 |
| 2 | 895 | 75 |
| 3 | 880 | 33 |
| Hydrogen Separator Pressure, p.s.i.g. | 300 |  |

Table III

| Tower | 41 | 44 |
|---|---|---|
| Flow Rates, bbl./hr.: |  |  |
| Feed | 441 | 45 |
| Overhead Product | 45 | 13 |
| Reflux | 322 | 300 |
| Kettle Product | 387 | 30 |
| Temperature, °F.: |  |  |
| Top Tower | 233 | 255 |
| Bottom | 290 | 273 |
| Pressure, p.s.i.g. (top tower) | 30 | 50 |
| Compositions, Liquid Volume Percent: |  |  |
| Benzene Content— |  |  |
| Feed | 5.0 | 32.1 |
| OHP | 32.1 | 11.0 |
| KP | 1.4 | 38.9 |

Table IV

| Stream No | 37 | 46 | 45 |
|---|---|---|---|
| 2,2-dimethylbutane and lighter | | 0.7 | |
| 2-methylpentane+2,3-dimethylbutane | | 20.3 | |
| 3-methylpentane | 0.1 | 14.8 | |
| n-hexane | 0.2 | 25.3 | 1.4 |
| 2,2-dimethylpentane+2,4-dimethylpentane | 8.4 | 0.3 | 12.0 |
| 2,3-dimethylpentane+2-methylhexane | 8.1 | | 5.1 |
| Methylcyclopentane | 0.2 | 27.8 | 25.8 |
| Benzene | | 11.0 | 42.2 |
| Cyclohexane | 68.3 | | 4.9 |
| 3,3-dimethylpentane | 8.4 | | 7.1 |
| 2,2,3-trimethylpentane | 0.4 | | 0.8 |
| Heavies | 6.0 | | |

Table V

| | Benzene hydrogenation | MCP Isomerization |
|---|---|---|
| Feed rates, bbl./hr.: | | |
| Hydrocarbon | 100 | 105 |
| Hydrogen (mols/hr.) | 100 | |
| Catalyst, hydrated nickel oxide | Fixed bed | |
| Aluminum chloride | | 75 |
| Hydrogen chloride | | 5 |
| Temperatures, °F.: | | |
| Reactor feed | 380 | 80 |
| Effluent | 470 | 140 |
| Pressure, p.s.i.g., reactor | 410 | 150 |

Table VI

Feed rates:
Hydrocarbon, bbl/hr _____ 450
Hydrogen ms.c.f.h _____ 3,180
H$_2$/hydrocarbon, mol/mol _____ 5.9
Liquid space velocity, vo./vol./hr _____ 2.3
Catalyst life, bbl./lb _____ 153

Reactor temperatures, °F.:
Inlet reactor No.—
1 _____ 955
2 _____ 955
3 _____ 955
ΔT Reactor No.:
1 _____ 108
2 _____ 144
3 _____ 82
Hydrogen separator pressure, p.s.i.g _____ 250

A natural cyclohexane stream such as that in stream 37, Table IV was heretofore only considered beneficial as a gasoline blending stock. The cyclohexane content of the stream could only be recovered in pure form by expensive fractionation, solvent extraction or crystallization because of the presence of the close-boiling dimethylpentanes. But these procedures are considered economically unfeasible for this separation. From the foregoing working example, it is seen that a natural cyclohexane stream can readily be upgraded by the process of my invention to a 98 percent pure material. Such a material is suitable for use as a chemical intermediate in the manufacture of products such as nylon.

Reasonable variations and modifications are possible within the scope of the foregoing disclosure, the drawings, and the appended claims to the invention, the essence of which is that there has been provided a process for producing high purity cyclohexane from a natural cyclohexane-containing fraction which contains dimethylpentanes by subjecting said fraction to catalytic reforming conditions, recovering from the reforming methylcyclopentane and benzene substantially free from dimethylpentanes, hydrogenating and isomerizing the methylcyclopentane and benzene and recovering high purity cyclohexane from the hydrogenated and isomerized material; and a modification of said process in which the natural cyclohexane-containing fraction is reformed in the presence of a low end point gasoline.

I claim:

1. A process for the production of a high purity cyclohexane from a natural cyclohexane-containing feed also containing close-boiling dimethylpentanes and n-hexane, benzene, and methylcyclopentane which comprises recovering from said feed a first fraction containing n-hexane, benzene, and methylcyclopentane, leaving a second fraction containing the cyclohexane and dimethylpentane, reforming said second fraction, recovering from the reforming zone effluent a third fraction containing methylcyclopentane, benzene, isohexane, and some n-hexane, leaving a fourth fraction containing reformate and dimethylpentanes, subjecting said first and third fractions together and in the presence of each other in a benzene-hydrogenation zone to benzene-hydrogenation conditions, then subjecting the hydrogenated fractions in an isomerization zone to methylcyclopentane-isomerization conditions, then recovering a high purity cyclohexane from the isomerization zone effluent.

2. A process for producing a high purity cyclohexane from a natural gasoline containing the same and close-boiling dimethylpentanes which comprises separating from said gasoline a hexane-containing fraction, removing from said hexane fraction a second fraction containing n-hexane, methylcyclopentane, and benzene, obtaining a third fraction containing cyclohexane and the close-boiling dimethylpentane, subjecting the gasoline from which the hexane-containing fraction has been separated and the third fraction containing cyclohexane and the close-boiling dimethylpentanes in a catalytic reforming zone to conditions of reforming, recovering from the reforming zone effluent a fourth fraction containing methylcyclopentane and benzene, substantially free from dimethylpentanes, subjecting the fourth obtained fraction together with said second fraction to hexane isomerization and benzene hydrogenation conditions, and recovering a high purity cyclohexane from the isomerized and hydrogenated effluent thus obtained.

3. A process according to claim 2 wherein the reforming zone effluent is separated essentially into said fourth fraction, a benzene concentrate containing the dimethylpentanes and a reformate.

4. A process according to claim 2 wherein an isohexane fraction is removed from the hexane-containing fraction before obtaining said second fraction.

5. A process for the production of a high purity cyclohexane from a natural cyclohexane-containing fraction also containing close-boiling dimethylpentanes which comprises subjecting said fraction to reforming conditions in a reforming zone, recovering from said zone a fraction containing methylcyclopentane and benzene, substantially free from dimethylpentane and hydrogenating and isomerizing said last fraction and obtaining a high purity cyclohexane from the resulting product.

6. A process according to claim 1 wherein said second fraction is reformed together with and in the presence of a gasoline feed stock.

7. A process according to claim 5 wherein said cyclohexane-containing fraction is subjected to reforming conditions together with and in the presence of a gasoline feed stock.

No references cited.